Nov. 5, 1957  C. E. TACK ET AL  2,812,040
ROTOR BRAKE SUSPENSION
Filed July 6, 1953  2 Sheets-Sheet 1

INVENTORS
Carl E. Tack
Fred E. Bachman
By O. B. Garner
Atty.

Nov. 5, 1957  C. E. TACK ET AL  2,812,040
ROTOR BRAKE SUSPENSION
Filed July 6, 1953  2 Sheets-Sheet 2

INVENTORS.
Carl E. Tack
Fred E. Bachman 2,812,040
Patented Nov. 5, 1957

2,812,040

ROTOR BRAKE SUSPENSION

Carl E. Tack, Chicago, and Fred E. Bachman, Granite City, Ill., assignors to American Steel Foundries, Chicago, Ill., a corporation of New Jersey Application July 6, 1953, Serial No. 366,198

5 Claims. (Cl. 188—59)

The invention relates to a rotor brake normally used on a railway car truck and more particularly to a novel suspension arrangement therefor.

It is a primary object of the invention to provide a novel suspension arrangement for a rotor brake of the type described.

It is a further object of the invention to provide an actuating cylinder having integral yoke supporting means for brake actuating levers.

It is an additional object of the invention to resiliently support the integral cylinder and yoke from an appropriate bracket positioned on the truck frame.

It is a further and more specific object of the invention to provide a torque lug integral with said cylinder whereby braking torque may be distributed to the truck frame.

It is another specific object of our invention to incorporate with the novel suspension means, as above described, a hand brake linkage arrangement whereby the brake levers may be manually actuated.

These and other objects of the invention will become apparent in the course of the following description and from an examination of the concerned drawings, wherein.

Figure 1:
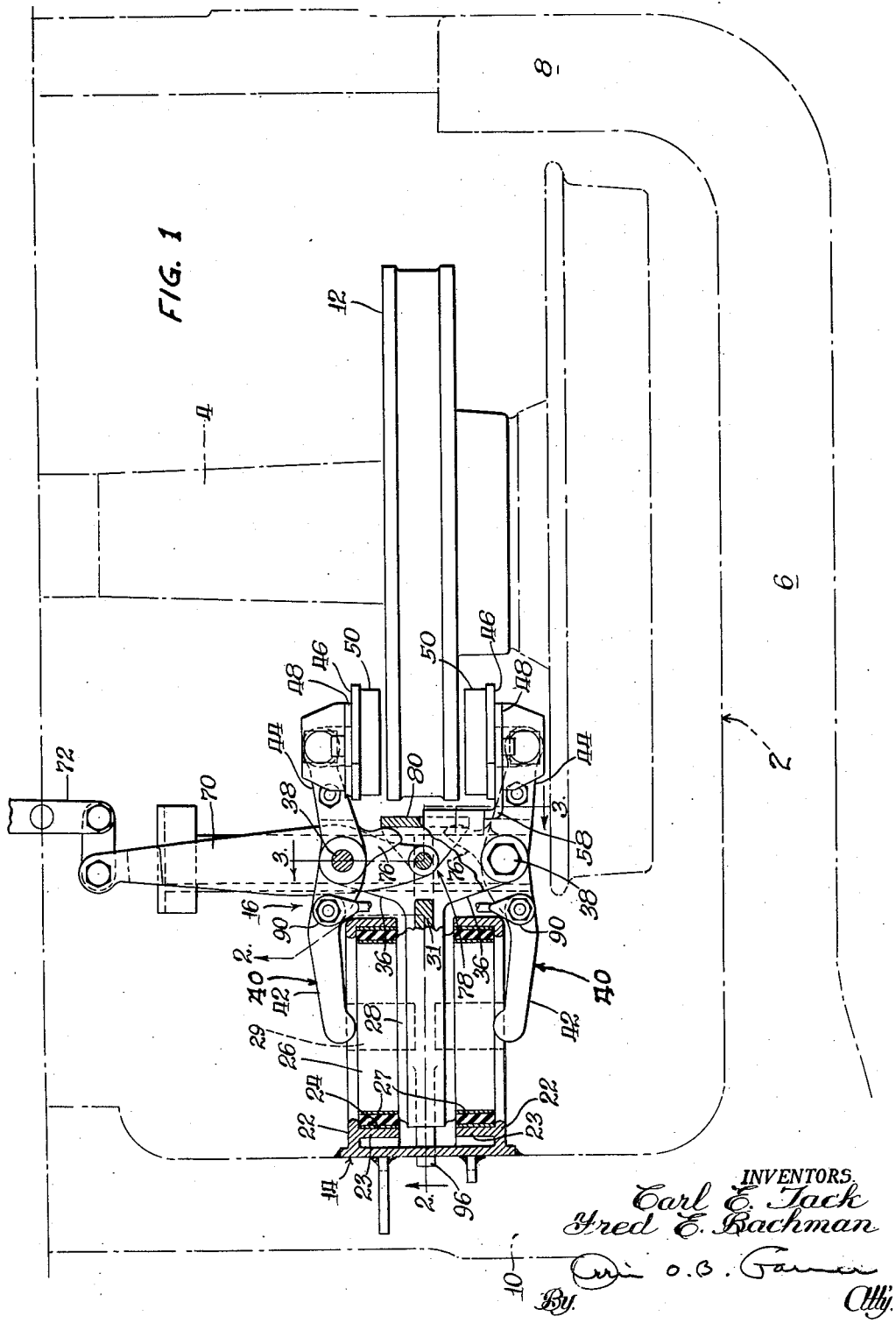
Figure 1 is a fragmentary plan view of one quarter of a railway car truck incorporating the invention, the view being taken substantially along the section line 1—1, as illustrated in Figure 2.

Describing the invention in detail, a conventional railway car truck is employed comprising a frame 2 supported from a wheel and axle assembly 4 in the conventional manner. The frame 2 comprises side rails 6, interconnecting end rails 8, and additional interconnecting transverse members 10 intermediate of the end rails 8. Positioned inboardly of the wheel on the assembly 4 is a brake rotor 12, said rotor being integrally connected with the axle or wheel whereby it rotates therewith. A bracket, indicated generally at 14 is rigidly connected, as by welding to the transverse member 10 at a point in substantial longitudinal alignment with the rotor 12. The bracket 14 offers means to mount a cylinder and brake lever assembly indicated generally at 16.

Figure 2:
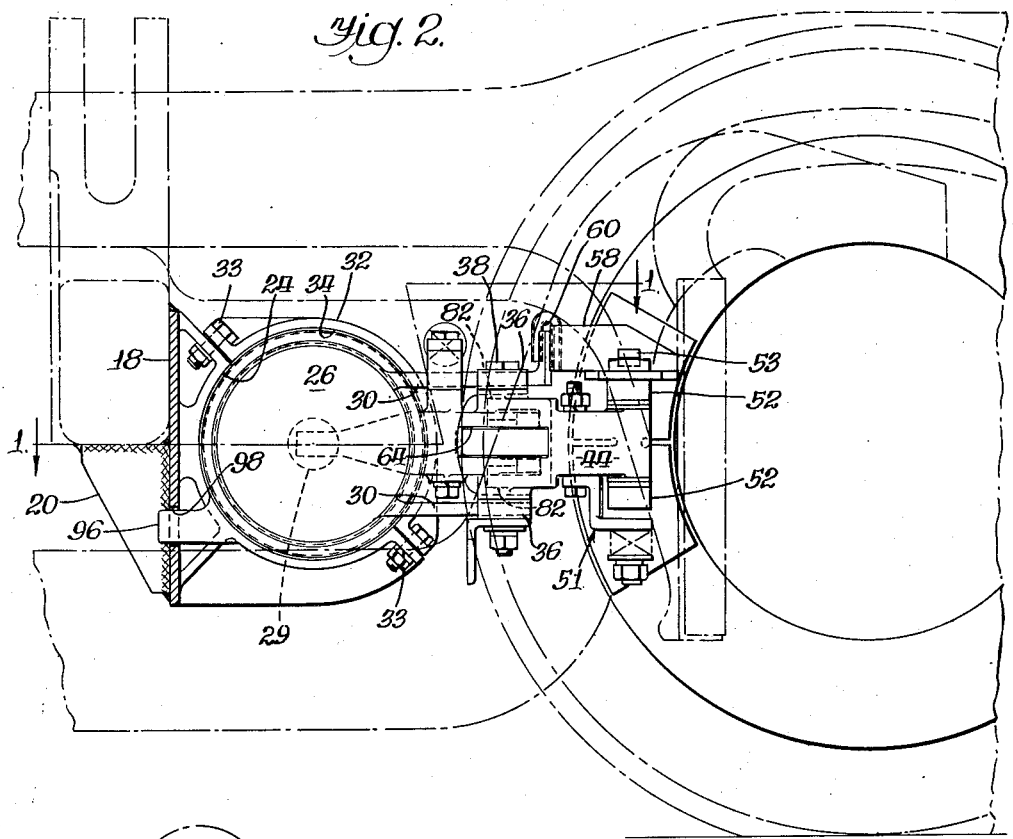
Figure 2 is a side elevational view of the structure shown in Figure 1, a partial section being taken along the line 2—2 of Figure 1.

Directing attention to Figure 2, it will be seen that the bracket 14 comprises a rear vertical plate 18 positioned adjacent the transverse member 10 and welded thereto at its upper end. Additional support is offered the plate 18 by gusset members 20, said members being perpendicularly arranged and secured to the rear face of the plate 18 and to the lower face of the transverse member 10. Forwardly of the transverse member 10 the bracket 14 comprises spaced vertical and longitudinally directed plates 22, 22, said plates 22 having integral flanges 23 directed transversely of the truck and forming a semi-cylindrical cradle or cylinder receptacle 24. It should be noted that the cradle 24 is angularly directed relative to the vertical and is preferably directed on an angle approximately 45° to the vertical, thereby providing relative easy assembly for the cylinder mechanism hereinafter described.

An operating air cylinder 26 having peripherally surrounding same resilient bushings or doughnuts 27 comprising cylindrical metallic bands bonded to the inner and outer peripheries of a flexible material such as rubber, is received in the cradle 24. Additionally, the cylinder 26 comprises, centrally thereof, conventional pistons 29 (see Figure 2) and an upstanding ledge or peripheral flange 28 (Figure 1), said flange 28 being integrally formed with spaced horizontal plates 30, 30 (Figure 2) forming a yoke directed forwardly of the cylinder 26. A vertical web 31 interconnects the plates 30. Split caps 32 also defining a semicylindrical cradle 34 may be positioned on opposite sides of the peripheral ledge 28 and disposed to abut complementary portions of the ledges 23. In this position, the caps 32 may be rigidly bolted to the bracket plates 23 as at 33, thereby confining the cylinder 26 between the caps and the bracket.

Referring again to the spaced vertical plates 30, 30, it will be seen that they are directed forwardly of the cylinder 26 and intermediate the caps 32, 32 and that they flare transversely of the truck immediately forwardly of the caps 32 to form wings 36, 36. Vertically aligned bores are defined adjacent the extremities of each pair of wings 36, 36, said bores offering mounting means for pivotal pins 38.

As best seen in Figure 1, a pair of brake levers 40 are provided with the assembly 16, each of said levers being pivotally mounted centrally thereof to the appropriate pivotal pin 38. Each brake lever 40 presents a rearwardly extending arm 42, said arms embracing and operatively engaging the pistons 29 of the cylinder 26. Forwardly of the pivot pins 38 the levers 40 present forwardly extending arms 44 disposed on opposite sides of the rotor 12. At the extremity of each arm 44 there is pivotally mounted a brake shoe assembly indicated generally at 46, each assembly comprising a brake head 48, and a carried friction shoe 50. On the face of each brake head 48, remote from the rotor, are positioned spaced mounting lugs 52, 52, said lugs having bores which are vertically aligned with a complemental bore in the end of each brake lever arm 44 whereby the brake head assembly 46 may be pivotally mounted thereto by means of the pin 53. At the lower side of the arm 44 there is mounted a conventional antirattle device (Figure 2) indicated generally at 51, said device 51 comprising a spring and arm arrangement operative to urge the brake shoe assembly downwardly into tight engagement with the upper side of the brake lever 40, as is well understood by those skilled in the art. Additionally, each brake head assembly is provided with a conventional shoe guiding arrangement comprising a plate 58 fixedly mounted on the external face of the brake head 48 and extending rearwardly toward the wings 36 of the spaced vertical plates 30. Each plate 58 presents a substantially transversely aligned inverted U slot 60 which receives an upstanding lug positioned on the forward edge of the top plate 30, whereby the related shoe is guided into full face engagement with the rotor.

Figure 3:
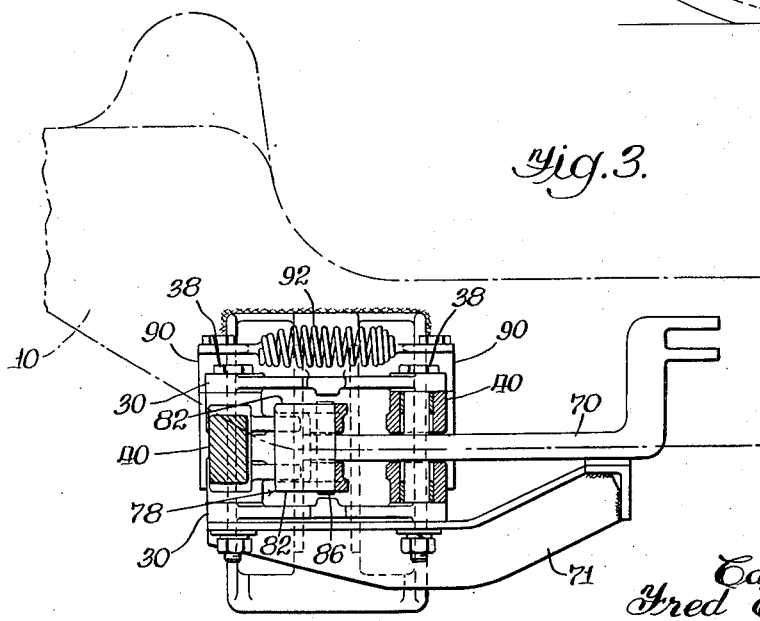
Figure 3 is a sectional end elevational view taken substantially along the line 3—3 of Figure 1.

Attention is now directed to the fact that each brake lever 40 presents a horizontally elongated slot 64 in the area of pivotal mounting to the pin 38. Though each lever is provided with a slot 64, only one of said slots is utilized in the arrangement herein described, said slots being provided in both brake levers so that a single type brake lever may be utilized in the assembly. Positioned in the slot 64 of the inboard brake lever 40 is the transversely directed hand brake actuating lever 70 (Figure 3), said lever being pivotally mounted on the inboard pin 38.

Inboardly of the pivot pin 38 the arm 70 extends to a point whereat it is connected to a brake linkage indicated at 72, said linkage 72 being appropriately connected to hand brake actuating means (not shown), as is well known to those skilled in the art. A support 71 (Figure 3) is secured to the underside of the mechanism 16 and presents a surface to carry the inboard end of the lever 70.

Integrally formed on each brake lever 40 approximately in the area of pivot is the actuating arm 76. It should be noted that the arms 76 are directed inboardly of the brake mechanism 16. A link indicated generally at 78 comprises a forward vertical plate 80 which is disposed to extend between and abut the respective actuating arms 76 of each brake lever 40. The link 78 further comprises spaced horizontal plates 82, 82 receiving therebetween the related outboard end of the brake lever 70. A pivotal pin 86 interconnects the adjacent end of the brake lever 70 and the spaced horizontal plates 82, 82 (Figure 3) of the link 78. Thus it will be readily seen that upon clockwise motion of the actuating lever 70 about its pivotal point 38, the link 78 is carried longitudinally of the truck, and because of its operative abutting relation with the actuating arms 76, 76, the brake levers 40 are urged to pivot thereby bringing the brake shoes 50 into engagement with the rotor 12.

On each brake lever 40 and rearwardly of the point of pivot 38 of said lever there is positioned an integral upstanding lug 90, the lugs on each brake lever being in alignment transversely of the truck. The lugs 90 provide convenient mounting for an interposed tensioned release spring 92, said release spring having its opposite ends bolted to the related lugs 90, 90.

Referring now to Figures 1 and 2, it will be readily seen that the peripheral ledge 28 formed centrally of the brake cylinder 26 is provided at the rear side thereof with an integrally formed and rearwardly extending torque lug 96. The lug 96 is preferably formed on said cylinder 26 below its horizontal mid-portion and is disposed to extend rearwardly of said cylinder intermediate the resilient mountings whereat it is received within a complementally formed hole 98 in the plate 18 of the bracket 14.

In operation, the brake cylinder 26 may be actuated in the usual manner thereby urging the related brake levers to rotate about the pivotal mountings 38 whereby the brake shoe assemblies are brought into contact with the opposite faces of the rotor 12. Engagement of the brake shoes with the rotating rotor 12 causes the braking assembly 16 to be carried in the direction of rotation of the rotor 12. Because of the integral yoke cylinder arrangement, the brake levers being carried by the yoke mounting wings 36, this rotating motion or brake torque is carried through the wings 36 and the plates 30 to the brake cylinder 26. The brake cylinder 26 is urged to rotate about its longitudinal axis thereby bringing the torque lug 96 into engagement with the edges of the slot 98 of the bracket 18. The engagement between the lug 96 and the bracket 18 prevents further rotation of the brake cylinder 26 and serves to distribute the brake torque caused by braking engagement directly to the truck frame 2 through the transverse member 10. The resilient bushings 27 serve to cushion the distribution of the braking torque. Upon release of the actuating pressure in the brake cylinder 26, the tensioned actuating spring 92 urges the brake levers 40 to rotate about their pivots 38, thereby disengaging the brake shoes 50 from the related faces of the rotor 12. Torque dissipation to the frame and the action of the resilient mounting of the brake cylinder 26 in the bracket 14 is substantially the same when the brake mechanism is actuated by means of the hand brake linkage arrangement through the actuating lever 70. Release of the braking mechanism is again accomplished by the spring 92 when the actuating pressure of the hand brake mechanism is released.

Thus it will be seen that I have provided a novel resilient suspension arrangement and torque dissipating arrangement comprising an integral brake cylinder and yoke and brake lever mounting arrangement that can be removed from the truck as a package unit and have additionally provided therewith appropriate means to manually actuate the brake arrangement in the event of failure of the brake cylinder.

We claim:

1. In a railway car truck, a wheel and axle assembly, a frame supported therefrom, a rotor secured to the assembly and rotatable therewith, a mounting bracket secured to the frame in substantial longitudinal alignment with the rotor, a semicylindrical cradle having an upwardly facing opening presented by the bracket, a power cylinder disposed within the opening of said cradle, a pair of caps each presenting semicylindrical cradles disposed to fit over the cylinder and engage the bracket, means fixedly connecting the cap to the bracket, resilient means interposed between the cylinder and the bracket cradle and cap cradles, a yoke comprising vertically spaced plates integrally connected to the cylinder and extending forwardly thereof between said caps, each plate presenting wings directed transversely of the truck, brake levers disposed substantially longitudinally of the truck, said brake levers being pivotally mounted to said wings at points intermediate the ends of each lever, a brake head assemblies pivotally mounted on adjacent extremities of said brake levers and having brake shoes engageable with opposite sides of the rotor, guide means for maintaining the brake head assembly and carried shoes in proper position to engage the rotor, said brake levers having portions thereof operatively connected to the cylinder, means associated with the cylinder to actuate said brake levers, release means comprising a spring having the opposite ends thereof connected to the respective brake levers, and a torque lug rigidly connected to the cylinder and operatively engaging the bracket.

2. In a railway car truck, a wheel and axle assembly, a frame supported thereby, a rotor rigidly secured to and rotatable with said assembly, a mounting bracket fixedly secured to the frame and having an aperture therein, a brake assembly detachably mounted to said bracket and removable therefrom as a package, said brake assembly comprising a power cylinder having a yoke thereon, brake levers pivotally connected to said yoke, brake shoes carried by said levers and a lug formed integrally with said cylinder and snugly received within the aperture of said bracket, said lug being operable to transmit the braking torque from the cylinder to the frame.

3. In a brake arrangement for a railway car truck, a wheel and axle assembly, a pair of friction surfaces rotatable with said assembly, a brake lever carrying a friction shoe adjacent each friction surface, a power cylinder comprising a body with oppositely facing pistons operatively connected to both of said levers, means on the cylinder to pivotally support said levers, a resilient support for said cylinder comprising a bracket and demountable caps defining a hollow cylindrical section directly receiving and clamping the body of said cylinder, and axially spaced independent resilient rubber bushings interposed between the bracket and the cylinder body.

4. In a brake arrangement for a railway car truck, a wheel and axle assembly, a frame supported thereby, a rotor secured to said assembly, brake shoes engageable with said rotor, brake levers pivotally carrying said shoes, a power cylinder having pistons operatively engaging said levers, means on the cylinder to pivotally support said levers, a frame supported bracket mounting said cylinder and having an aperture therein, axially spaced resilient bushings surrounding said cylinder and interposed between said cylinder and said bracket, and a torque lug on the cylinder received within the aperture of the frame and disposed intermediate said resilient bushings and said levers and in longitudinal alignment with said rotor.

5. In a brake arrangement for a railway car truck, a wheel and axle assembly, a rotor rotatable with said assembly, a frame supported by said assembly, a transverse member on said frame carrying a bracket in longitudinal alignment with said rotor, said bracket comprising transversely spaced longitudinally extending plates, ledges integrally formed with respective plates and defining semicylindrical cradles having upwardly facing openings, a pair of caps, each defining a semicylindrical cradle having a downwardly facing opening and connectible to the respective plates and ledges to define therewith a cylindrical bore extending transversely of the truck, an operating cylinder disposed in said bore, resilient bushings surrounding said cylinder and abutting the related cradles, a peripheral ledge formed on said cylinder intermediate said caps and said ledges, a torque lug integrally formed with said ledge and extending rearwardly from the cylinder and received within an opening in said bracket, a yoke formed integrally with said peripheral flange and extending forwardly from the cylinder, brake levers on opposite sides of said cylinder, pistons in said cylinder operatively engaging said brake levers for actuation thereof, pivot pins in said yoke on opposite sides thereof pivotally mounting the respective levers, brake shoes pivotally carried on the extremities of the levers remote from said cylinder, said brake shoes being operatively engageable with said rotor, arms on said levers immediately adjacent the pivotal mounting to said yoke, a hand brake actuating lever pivoted to one of said pins, a link pivotally connected to said hand brake actuating lever, said link operatively engaging the arms on the respective brake levers, and release means operatively connected to the respective brake levers.

References Cited in the file of this patent
UNITED STATES PATENTS

| | | |
|---|---|---|
| 2,377,190 | Tack | May 29, 1945 |
| 2,436,136 | Baselt | Feb. 17, 1948 |
| 2,581,746 | Baselt | Jan. 8, 1952 |
| 2,655,226 | Tack et al. | Oct. 13, 1953 |
| 2,656,900 | Tack | Oct. 27, 1953 |